United States Patent [19]

Hall et al.

[11] 4,424,346

[45] Jan. 3, 1984

[54] DERIVATIVES OF CHITINS, CHITOSANS AND OTHER POLYSACCHARIDES

[75] Inventors: Laurance D. Hall; Mansur Yalpani, both of Vancouver, Canada

[73] Assignee: Canadian Patents and Development Ltd., Ottawa, Canada

[21] Appl. No.: 270,414

[22] Filed: Jun. 4, 1981

[51] Int. Cl.$^3$ .................... C08B 37/08; A61K 31/70
[52] U.S. Cl. ..................... 536/20; 424/180
[58] Field of Search .................. 536/20; 424/180

[56] References Cited

U.S. PATENT DOCUMENTS

| | | | |
|---|---|---|---|
| 2,168,375 | 8/1939 | Thor | 536/20 |
| 2,795,579 | 6/1957 | Doczi | 536/20 |
| 2,831,851 | 4/1958 | Vogler | 536/20 |
| 3,953,608 | 4/1976 | Vanterberghe | 536/20 |
| 4,027,068 | 5/1977 | Saad | 536/20 |
| 4,063,016 | 12/1977 | Austin | 536/20 |
| 4,301,067 | 11/1981 | Koshugi | 536/20 |
| 4,304,905 | 12/1981 | Koshugi | 536/20 |

OTHER PUBLICATIONS

Chem. Abstr. 89, 1978, 64708g.

Chem. Abstr. 91, 1979, 126598y.

Primary Examiner—A. Siegel
Attorney, Agent, or Firm—Alan A. Thomson

[57] ABSTRACT

Derivatives have been formed from chitins and chitosans in which the amine residues on the polyglucosamine have been modified to form the groups:

(a) $-N=CHR$ or $-NHCH_2R$
(b) $-NHR'$
(c) $-NHR''$ and
(d) $-NH-CH_2CO_2H$ or $-NH-$glyceryl where
R is an aromatic moiety having at least one hydroxyl or carboxyl group, or a macrocyclic ligand
R' is an aldose or ketose residue, and,
R" is an organometallic aldehyde residue.

These derivatives are useful in chelating metals, in pharmaceutical formulations, in cosmetics, in chromatographic separations, in enzyme immobilization, as catalysts, etc. Galactomannans having selected amine-containing side chains have also been prepared by reductive amination.

10 Claims, No Drawings

DERIVATIVES OF CHITINS, CHITOSANS AND OTHER POLYSACCHARIDES

FIELD OF THE INVENTION

This invention is directed to derivatives of natural polysaccharides, e.g. chitins and chitosans in which free amino groups are substituted with selected groups attached through a nitrogen-carbon linkage. Certain groups have been found to be introduceable by reductive alkylation, and the carboxymethyl group has been introduced from monochloroacetic acid. Selected amine moieties have been introduced into galactomannans.

BACKGROUND AND PRIOR ART

Chitin is very widely distributed in the plant and, to an even greater extent, animal kingdom, where its main function is the provision of structural and skeletal support. Chitin is found most abundantly in fungi, while chitosan is obtained mainly by N-deacetylation of chitin, but also occurs in nature. The importance of chitin is emphasized by its natural abundance, an estimated $10^{10}$–$10^{11}$ tons annually, which makes it one of the most abundant organic materials on earth.

Chitin is a linear polymer of $\beta$-D (1-4) linked 2-acetamido-2-deoxy-D-glucopyranose units, of which a proportion, typically ~15%, is N-deacetylated (the fully acetylated polymer is called chitan). The molecular weight of the chitan has been estimated at $1.04 \times 10^6$, while that of chitosan ranges between $1.45$–$1.80 \times 10^5$. Chitin, like cellulose, has a ribbon-like structure. These crystalline forms, $\alpha$, $\beta$, and $\gamma$-chitin are distinguished on the basis of different chain arrangements and the presence of bound water. In contrast to most other polysaccharides, chitin and chitosan have basic characteristics ($pK_a$ of chitosan is 6.3) which impart them with unique properties in terms of solubility, viscosity, polyelectrolyte behaviour, membrane forming ability and metal chelation.

Both these aminopolysaccharides are insoluble in common organic solvents, water, dilute acids, or cold alkalis of any concentration. There are only a few solvents or solvent systems which do not give rise to hydrolysis, degradation, or N-deacetylation. Chitin dissolves, for example, in 9 N HCl, or >9 N $H_2SO_4$ with hydrolysis of the glycosidic and amide linkages. The solvent systems for chitin which are more satisfactory include hexafluoroisopropanol, hexafluoroacetone sesquihydrate, certain chloroalcohols, and hot concentrated solutions of neutral salts which are capable of high degrees of hydration, such as saturated lithium thiocyanate solution at 95° C. Chitosan is soluble in a number of organic acids, including formic and acetic acid. Chitosan products have found a wide range of industrial applications and certain derivatives have been implicated in medical applications.

The outstanding industrial importance of polysaccharides arises from their useful interactions with a wide variety of molecules ranging from food ingredients and pharmaceuticals, to inorganic particles, clay slips and oil well muds. These interactions occur mostly in aqueous media and the solubility properties of polysaccharides are therefore of great interest. Their unique solubility properties constitute, at the same time, one of the major problems in the development of polysaccharide chemistry. Although these properties are known to follow certain trends, a systematic understanding of the relation of primary polysaccharide structure to physical behaviour in aqueous solution, and of polysaccharide-solute interactions, etc., remains to be established.

Natural polysaccharides can be classed into different solubility groups according to their structure and conformation. Thus, linear polysaccharides with a regular, ribbon-like structure such as cellulose and chitin, form highly ordered, often crystalline arrays which are difficult to dissolve due to strong cohesive forces, whereas branching usually leads to an enhancement in solubility and a reduction in the intermolecular interactions. Highly branched polysaccharides are almost always water-soluble. Solubility can also be affected by a series of other factors such as ionic charges, structural irregularities, glycosidic linkages which preclude ribbon structures, low molecular weight, and a wide molecular weight distribution. The possibility of modifying polysaccharide solubility by chemical derivatization is a relatively novel concept which is gaining increasing importance for a wide variety of medicinal applications, including polymer-mediated drug release.

Previous workers have applied various synthetic reaction routes to form modified products such as copolymerization, orthoesters, acetobromosugars, hydrazones, or enzymic glycolysations to polysaccharides such as cellulose, amylose, and alginic acid. These procedures, however, suffer from various limitations since they require (i) specific protection of the linear polysaccharide, such as in the reaction of 1,2-orthoacetate sugars with 2,3-di-O-phenylcarbmoyl derivatives of amylose and cellulose; (ii) activation of the sugar which is to form the side chain; or (iii) reaction conditions which lead to partial or extensive polysaccharide degradation, e.g. using hydrazinehydrate. Most of the reactions are also laborious and low-yielding, all reasons which mitigate against routine or large-scale adaption.

The primary amine functions of chitosan have been derivatized with a number of anhydrides (S. Hirano, Y. Ohe and H. Ono, Carbohydr. Res. 47, 315, 1976), and common aliphatic and aromatic aldehydes (S. Hirano, N. Matsuda, O. Miura, and H. Iwaki, Carbohydr. Res. 71, 339, 1979; and S. Hirano, N. Matsuda, O. Miura, and T. Tanaka, Carbohydr. Res. 71, 344, 1979), invariably affording insoluble products (Schiff's base derivative). Although certain water-soluble ether and salt derivatives of chitosan are known, no attempts had previously been made to affect the solubilization of chitosan by introducing suitable hydrophilic moieties into the polymer.

The application of polymers as support matrices for chelation, clinical use, catalysis, as well as for synthesis has grown rapidly since their use in peptide synthesis was demonstrated by Merrifield. One facet of this effort has been directed at incorporating metal ions or metal complexes into polymers using a variety of chelating groups. Some problems encountered in many of these studies derive from the often complex and costly synthesis, from inefficient metal chelation, and from the leaching into solution of the metal complex from the polymer. The search for new and efficient chelating polymers constitutes, therefore, a major area of research. Numerous other reasons exist for interest in metal-polymer conjugates including the study of metal complexes in biological systems, metal-based affinity chromatography, and the treatment of environmental pollutants. In spite of a number of studies of metal chelation by the native polymers, only a few very recent attempts to improve their chelating capacity by means of chemical derivatization have been described in the literature [M. Takahashi, K. Shinoda, T. Mori, and T. Kikyo, Japanese Patent 78 03982, 1978, (Chem. Abstr. 89, 1978, 64708g); T. Sakaguchi, A. Nakajima and T. Horikoshi, Nippon Nogei Kagaku Kaishi, 53, 149, 1979, (Chem. Abstr. 91, 1970, 126598y)].

U.S. Pat. No. 3,879,376, Apr. 22, 1975, to Vanlerberge, describes chitosan derivatives formed by acylation with organic diacid anhydrides to introduce some substituent groups of the type —NH—CO—R—COOH. These derivatives are used as skin moisturizing agents in cosmetic compositions.

It would be desirable to introduce a variety of substituents so that the amino groups in the polysaccharide are attached directly to a carbon atom in the substituents.

SUMMARY OF THE INVENTION

Amine-containing polysaccharides, in which at least a portion of the amino groups are free to react, have been reductively alkylated with various aldehyde or keto compounds to introduce substituents of the following types:
  aromatic compounds, macrocyclic ligands
  various sugars
  organometallic compounds and
  the carboxymethyl or glyceryl groups.

Using chitin and chitosan as examples, a method was devised which is suitable for the transformation of amine-containing polysaccharides into stable, branched-chain derivatives. The reaction itself represents a further example of the reductive amination procedure which is compatible with essentially any aldehydo compound or compound readily oxidized or hydrolyzed to an aldehyde. Under typical conditions, chitosans, dissolved in a mixture (1:1) of dilute (1%) aqueous acetic acid and methanol, was reductively alkylated using a solution of the carbonyl-containing reactant (1.1–3.2 molar equivalents per hexosamine residue (mol/GlcN) at room temperature.

The reductive alkylation is simply and conveniently effected in good yields preferably with sodium cyanoborohydride. In the case of the carboxymethyl groups, monochloroacetic acid is utilized.

The versatile combination of Schiff's base-formation and reductive amination provides a convenient route for attaching a wide range of medicinally or otherwise important molecules to chitosan, which itself is a biodegradable material. Medicinal application, in particular, would clearly benefit from the additional options of selectively either solubilizing the polymer backbone, (an example of which will be described subsequently) or conversely, reducing its solubility by reaction of chitosan with another species.

This invention comprises as products, derivatives of amine-containing polysaccharides wherein at least a portion of the amine groups are covalently bound through a =CH— or —CH$_2$— linkage to substituents selected from: aromatic compounds having at least one hydroxyl or carboxyl group; aldose or ketose residues; organometallic residues; and a carboxymethyl or glyceryl group.

The invention includes derivatives of chitin and chitosan and the substituents, including the amine N, having the structure:
 (a) —N=CHR or —NHCH$_2$R
 (b) —NHR'
 (c) —NHR" and
 (d) —NH—CH$_2$CO$_2$H or —NH—glyceryl, respectively, where
  R is an aromatic moiety having at least one hydroxyl or carboxyl group, or other chelating function,
  R' is an aldose or ketose residue attached via the aldehyde or keto carbon atom, and
  R" is an organometallic aldehyde residue attached via the aldehyde carbon atom.

The invention also includes the chitin and chitosan derivatives with substituents of the type (a), and (d) in the form of metal chelates thereof.

The invention further includes chitosan derivatives having a mixture of substituents selected from (a), (b), (c), and (d) to give a desired balance of properties. For example, a mixture of aromatic and sugar substituents can be used to give both high water solubility and high metal chelation capacity.

DETAILED DESCRIPTION AND PREFERRED EMBODIMENTS

Any amine-group-containing polysaccharides can be utilized with naturally-occurring chitins and chitosans being preferred. Chitosans with at least about 50% of their amino groups free to react are most suitable.

The aromatic substituents can be derived from any aromatic aldehyde having at least one hydrophilic group selected from hydroxyl and carboxyl. Suitable compounds include salicylaldehyde, 3-formyl-2-hydroxybenzoic acid, pyridine aldehydes and and their derivatives, formalcinnamic acid, and cyclodextrins, crown-ethers and cryptands.

The saccharide or sugar substituent can be derived from any aldose or ketose, or sugars oxidizable or hydrolyzable to aldoses or ketoses. The sugar should not have free amine groups or steric hindrance which would hinder reaction with the amine group on the chitin or chitosan. Suitable aldoses or sugars include glucose, galactose, arabinose, xylose, N-acetylglucosamine, lactose, cellobiose, maltose, and melibiose. Glyceraldehyde can be utilized to introduce the glyceryl group.

The aromatic substituents, and to some extent the (b) and (d) substituents, chelate metal ions and form stable chelates which can be used as catalysts, etc. Suitable metals include iron, nickel, copper, zinc, lead, silver, mercury, palladium, uranium, chromium and platinum.

Organometallic aldehydes can be incorporated similarly and the products may also be used as catalysts and in medical treatments. Suitable organometallic aldehydes or ketones include ferrocene aldehydes, haemin and m-toluidine chromium tricarbonyl.

The carboxymethyl group can be introduced using monochloroacetic acid as detailed in the examples.

The following examples are illustrative. Chitin (from crab shells) and chitosan (from shrimp shells) were obtained commercially and used without further purification. Reactions were conducted at ambient temperature unless noted otherwise.

(i) General Procedure

Chitosan (500 mg, 3 mM) was dissolved with stirring in a mixture (1:1) of methanol and 1% aqueous acetic acid (solvent A) or in the latter medium (solvent B) (30 ml). To the resulting viscous solution was added with vigorous stirring a solution (10–20 ml) of the carbonyl-containing compound (3.3–10 mM) and sodium cyanoborohydride (20 mM). The reaction mixture was left stirring at room temperature for 3–18 hr until a gel had formed. The solvent excluded by the gel was decanted, the gel was broken up, repeatedly washed with methanol (150 ml) and finally with diethyl ether (150 ml). The solid products thus obtained were first air-dried for several hours, then dried in vacuo at 56° C. for 12–18 hr, and finally crushed into a fine powder. In the cases where no gel was formed, the reaction mixture was dialyzed in dialysis bags against distilled water for periods of 4–6 d with frequent (~15–20) changes of water to obtain, after lyophilization, mostly white materials.

(ii) Reactions of Chitosan with Reducing Sugars

EXAMPLE 1

[1-deoxy-1-galactit-1-yl] chitosan

Addition of galactose (1.20 g, 6.7 mM) led to the formation of a stiff, glassy gel within 1–2 hr. The product [degree of substitution (d.s.) 0.9] was ivory coloured.

Anal. for [$(C_8H_{13}NO_5)_{0.1}(C_{12}H_{23}NO_9)_{0.9}$].1.9 $H_2O$; calcd. C 40.07, H 7.49, N 4.03; found C 40.09, H 7.58, N 3.97.

When a smaller amount of galactose (1.10 g, 6.1 mM) was used, the resulting product had a lower d.s. (0.7).

Anal. for [$(C_6H_{11}NO_4)_{0.3}(C_{12}H_{23}NO_9)_{0.7}$].0.61 $H_2O$; calcd. C 42.65, H 7.24, N 4.88; found C 42.59, H 7.20, N 4.97.

EXAMPLE 2

[1-deoxy-1-glucit-1-yl] chitosan

Addition of glucose (0.72 g, 4 mM) in aqueous methanol produced no gel. Further addition of 0.9 g (5 mM) afforded a firm white gel which was washed and dried. The solid obtained (0.86 g) appeared to be inhomogeneous and was dialyzed for 4 days. After work-up, the product had d.s. 0.9 (0.64 g, 71%).

Anal. for [$(C_8H_{13}NO_5)_{0.02}(C_6H_{11}NO_4)_{0.08}(C_{12}H_{23}NO_9)_{0.9}$]0.51 $H_2O$; calcd. C 43.05, H 7.22, N 4.39; found C 42.80, H 7.10, N 4.60.

EXAMPLE 3

[1-deoxy-1-(2-deoxy-2-N-acetylamino) glucit-1-yl] chitosan

Addition of N-acetylglucosamine (1.07 g, 4.84 mM) produced an elastic clear gel after standing overnight, which hardened and turned white after 24 hr. The product had d.s. 0.97.

Anal. for [$(C_8H_{13}NO_5)_{0.03}(C_{14}H_{25}N_2O_9)_{0.97}$].2.9 $H_2O$; calcd. C 40.20, H 7.44, N 6.69; found C 39.99, H 6.90, N 6.55.

EXAMPLE 4

[1-deoxy-1-cellobiit-1-yl] chitosan

Addition of cellobiose (3.5–6.6 mM) produced no gel after 2 days. The product had d.s. 0.3.

Anal. for [$(C_8H_{13}NO_5)_{0.05}(C_6H_{11}NO_4)_{0.65}(C_{18}H_{33}NO_{14})$].0.72 $H_2O$; calcd. C 42.47, H 7.04, N 5.11; found C 42.38, H 7.06, N 5.15.

EXAMPLE 5

[1-deoxy-1-lactit-1-yl] chitosan

Addition of lactose (1.2 g, 3.5 mM) produced a milky solution but no gel when the reaction mixture was left stirring for 10 hr. This product (A) had d.s. 0.23. Similarly, no gel was formed when the lactose to glucosamine (L/G) ratio was increased to 1.5 (1.5 g, 4.5 mM lactose); the product isolated after 30 hr had d.s. 0.12 (B), while the same L/G ratio produced a white gel when the reaction mixture was left undisturbed for 144 hr (with occasional addition of reducing agent). This product (C) had d.s. 0.78 after dialysis. When the L/G ratio was increased to 2.94 (3.0 g lactose) a white soft gel was formed within 24 hr, which, after nine washes with methanol (150 ml) and ether (150 ml), produced a material (D) whose elemental analysis indicated a fully substituted (d.s. 0.94) product containing one equivalent of unreacted lactose per repeating unit. Subsequent extensive dialysis (5 d) of (D) produced a clear sol (E) with d.s. 0.94.

When the reaction was carried out in the absence of sodium cyanoborohydride, using an L/G ratio of 3.90, no gel formed after 28 hr and the resulting product (F) had d.s. 0.1. The analyses for these lactityl derivatives are summarized in Table 1.

TABLE 1

| Product | Anal. for [$(C_8H_{13}NO_5)_m(C_6H_{13}NO_4)_n(C_{18}H_{23}NO_{14})_p$] × $H_2O$ | | | | | | | | | |
|---|---|---|---|---|---|---|---|---|---|---|
| | Formula | | | | C | | H | | N | |
| (d.s.) | m | n | p | x | calcd | found | calcd | found | calcd | found |
| A(0.23) | 0.07 | 0.7 | 0.23 | — | 44.01 | 44.29 | 6.99 | 7.27 | 5.85 | 5.96 |
| B(0.12) | 0.07 | 0.81 | 0.12 | 0.79 | 41.85 | 41.69 | 7.12 | 7.03 | 6.44 | 6.60 |
| C(0.78) | 0.07 | 0.15 | 0.78 | 2.9 | 39.52 | 39.29 | 7.30 | 6.88 | 2.98 | 3.00 |
| F(0.1) | 0.03 | 0.87 | 0.1 | 0.92 | 41.22 | 41.01 | 7.13 | 7.01 | 6.63 | 6.71 |

Anal. for (E) [$(C_8H_{13}NO_5)_{0.01}(C_{18}H_{33}NO_{14})_{0.94}+0.05(C_{12}H_{33}O_{11})$].1.62$H_2O$; calcd. C 41.72, H 7.06, N 2.63; found C 41.44, H 7.06, N 2.81.

Anal. for (D) [$(C_8H_{13}NO_5)_{0.01}(C_{18}H_{33}NO_{14})_{0.94}+C_{12}H_{22}O_{11}$].1.9 $H_2O$; calcd. C 41.80, H 6.86, N 1.59; found C 41.49, H 6.96, N 1.55.

EXAMPLE 6

[1-deoxy-1-maltit-1-yl] chitosan

Addition of maltose (1.74 g, 5.09 mM) produced a relatively viscous solution after standing of the reaction mixture for 12 hr, and a stiff, white gel was formed within 24 hr. The product had d.s. 0.6.

Anal. for [$(C_8H_{13}NO_5)_{0.01}(C_6H_{11}NO_4)_{0.39}(C_{18}H_{33}NO_{14})_{0.6}$].1.98 $H_2O$; calcd. C 40.38, H 7.23, N 3.56; found C 40.14, H 6.72, N 3.67.

EXAMPLE 7

[1-deoxy-1-melibiit-1-yl] chitosan

Addition of melibiose (1.20 g, 3.5 mM) led to the formation of an initially (4 hr) soft gel which hardened on standing (12 hr). The product had d.s. 0.6.

Anal. for [$(C_8H_{13}NO_5)_{0.01}(C_6H_{11}NO_4)_{0.39}(C_{18}H_{33}NO_{14})_{0.6}$].0.59 $H_2O$; calcd. C 43.12, H 6.96, N 3.81; found C 43.05, H 6.87, N 3.80.

The reactions of chitosan with various aldehyde-, keto-, lactone-, and non-reducing sugars, are summarized in Table 2. These results as in Table 2 revealed the following points. The reactions of chitosan with aldehydo sugars proceed, in general, smoothly yielding products with mostly high degrees of substitution (d.s.) in almost all cases; these reactions were accompanied by the formation of soft to very rigid, transparent or milky-white gels with, in the latter case, attendant synereses. Monosaccharides produced gels at almost twice the rate of disaccharides and the d.s. of the chitosan products increased with increasing amounts of aldehydo sugar used (with one exception for lactose).

In this series of experiments, no products were obtained for the reactions with glucosamine and galactosamine despite the fact that very soft white gels were produced with glucosamine. Coulombic repulsion between the protonated amine groups of chitosan (pH ~4.5) and those at C2 of the respective hexosamines seems to be primarily responsible for the lack of product formation in the latter two cases since a fully substituted chitosan derivative was obtained using N-acetylglucosamine. The amine function at C2 of the side-chain of this latter substituent provides, upon N-deacetylation, a convenient locus for further reductive alkylation reactions which afford branched, tree-like derivatives.

TABLE 2
Reactions of Chitosan with Carbohydrates

| Compound added | Conditions (mol/GlcN) | Time (hr) | Gel$^a$ | Product d.s.$^b$ |
|---|---|---|---|---|
| glucose | 1.33 | 8 | 6 | n.d.$^c$ |
|  | 3.00 | 8 | 1,5 | 0.9 |
| galactose | 2.03 | 4 | 1,3 | 0.7 |
|  | 2.22 | 4 | 1,3 | 1.0 |
| glucosamine | 1.3–1.6 | 8 | 4,5 | 0 |
|  | 2.7 | 72 | 4,5 | 0 |
| galactosamine | 1.17–2.73 | 72 | 6 | 0 |
| N—acetylglucosamine | 1.6 | 12 | 1,3 | n.d. |
|  | 1.6 | 24 | 1,5 | 1.0 |
| cellobiose | 1.17 | 12 | 7 | n.d. |
|  | 2.2 | 36 | 7 | 0.3 |
| lactose | 1.17 | 10 | 6 | 0.25 |
|  | 1.5 | 30 | 6 | 0.14 |
|  | 1.54 | 144 | 1,5 | 0.8 |
|  | 2.92–2.94 | 24 | 1,5 | "2.0"$^d$ |
| maltose | 1.7 | 12 | 7 | n.d. |
|  | 1.7 | 30 | 1,5 | 0.6 |
| melibiose | 1.11 | 4 | 1,4 | n.d. |
|  | 1.11 | 18 | 1,5 | 0.6 |
| maltotriose | 1.3 | 12 | 6 | 0 |
| fructose | 2.2–3.2 | 30 | 7 | 0 |
| α-glucoheptonic lactone | 3.2 | 72 | 6 | 0 |
| melizitose | 1.05 | 24 | 7 | n.d. |
|  | 1.05 | 240 | 2 | 0 |
| trehalose | 1.3 | 72 | 6 | 0 |

$^a$(1–5): gels formed; (1) rigid; (2) ropy; (3) transparent; (4) very soft; (5) white; (6) gel not formed; (7) very viscous solution
$^b$obtained from microanalysis
$^c$not determined
$^d$see Ex. 5

EXAMPLE 8

Oxidations with Galactose Oxidase

[1-deoxy-6'-aldehydo-lactit-1-yl] chitosan

[1-deoxy-1-lactit-1-yl] chitosan from Ex. 5 (103 mg, 0.13 mequiv. galactose) was dispersed in phosphate buffer (25 mM, pH 7, 10 ml) and formed a soft glassy gel which was purged with $O_2$ for 1 minute. Catalase (14400 units) and galactose oxidase (90 units) solutions were added and a viscous, ropy material formed after a few hours. The polysaccharide was diluted with water (10 ml) after 2 d and then poured into absolute ethanol (150 ml). The precipitate was collected by centrifugation (9000 rpm, 40 min) and dried, yielding 93 mg of the oxidized product 1-deoxy-6'-aldehydo-lactit-1-yl chitosan.

[1-deoxy-6'-aldehydo-melibiit-1-yl] chitosan

[1-deoxy-1-melibiit-1-yl] chitosan from Ex. 7 (100 mg., 0.13 mequiv. galactose) was dissolved in dilute acetic acid and the pH was raised to 4.5 by addition of aqueous $NaHCO_3$ solution yielding a gel which was treated as above. 95 mg of the oxidized product were isolated.

Reductive Amination of C-6 Aldehyde Chitosan Derivatives (a) The C6' aldehydo lactityl chitosan (43 mg, 0.06 mequiv. galactose) was suspended in aqueous methanol (15 ml) to which was added a solution of amine spin label [32] (150 mg, 0.9 mM) and $NaCNBH_3$ (0.1 g, 2 mM) in the same solvent (5 ml). The amination was carried out for 12 hr and the product was purified by dialysis (3 d); esr double integration gave a d.s. ~0.7 (the microanalytical results could not be exactly matched with a molecular formula; found C 40.82, H 6.53, N 3.87); [32]=4-amino-2,2,6,6-tetramethylpiperidin-1-oxyl.

(b) The C6' aldehydo melibiityl chitosan (58 mg, 0.08 mequiv. galactose) was treated as above in (a) yielding a product with d.s. ~0.15 (from esr); found C 41.47, H 6.77, N 3.92.

EXAMPLE 9

[N-Salicylidene] Chitosan

To chitosan (500 mg, 3.0 mM), dissolved in a mixture (1:1, 25 ml) of methanol and 1% aqueous acetic acid, was added dropwise and with vigorous stirring, salicylaldehyde (0.35 ml, 3.5 mM). The resulting yellow, initially very viscous solution turned into a thick gel within minutes. A saturated aqueous solution of $NaHCO_3$ was added (2 ml) to prevent acid hydrolysis of the Schiff's base. A further portion of salicylaldehyde (0.35 ml, 3.5 mM) was added dropwise resulting in a further stiffening of the gel, to which was then added methanol (80 ml) and $NaHCO_3$ solution (1 ml). After a few minutes, the solvents were decanted and the wash was repeated twice, the pH of the final wash being neutral. The gel was left standing in methanol (100 ml) for 4 hr, then filtered on a sintered glass funnel, washed with methanol and diethyl ether (100 ml each), air-dried for several hours and finally dried in vacuo at 56° C. Yield 0.75 g, d.s. 0.97.

Anal. for $[(C_8H_{13}NO_5)_{0.02}(C_{13}H_{15}NO_5)_{0.98}]\cdot 0.65$ $H_2O$; calcd. C 56.20, H 5.94, N 5.08; found C 56.36, H 5.84, N 5.09.

Addition of a total 4.2 mM salicylaldehyde resulted in a product with lower d.s. (0.7).

Anal. for $[(C_8H_{13}NO_5)_{0.03}(C_6H_{11}NO_4)_{0.27}(C_{13}H_{15}NO_5)_{0.7}]\cdot 0.72$ $H_2O$; calcd. C 53.02, H 6.21, N 5.64; found C 52.84, H 5.97, N 5.67.

EXAMPLE 10

[N-(2-cresol)]-chitosan

The same procedure as for Ex. 9 was employed using $NaCNBH_3$ (0.2 g) concomitant with the addition of salicylaldehyde. Addition of the reducing agent caused the yellow colour of the product to fade and no gel was formed initially. The solution was left stirring overnight resulting in a soft gel. Further addition of the same quantities of salicylaldehyde and NaCNBH$_3$ afforded a soft, ivory coloured gel which was dialyzed (3 d) against distilled water, and lyophilized to give a fluffy white material (0.44 g), d.s. 0.7.

Anal. for [(C$_8$H$_{13}$NO$_5$)$_{0.03}$(C$_6$H$_{11}$NO$_4$)$_{0.27}$(C$_{13}$H$_{17}$NO$_5$)$_{0.7}$].0.76 H$_2$O; calcd. C 52.55, H 6.76, N 5.59; found C 52.30, H 6.50, N 5.55.

When the reduction was carried out after the Schiff's base gel had formed, the latter retained its rigidity and, to a large extent, its yellow colour. After the usual workup, a yellow product with d.s. 0.85 was obtained (0.70 g).

Anal. for [(C$_8$H$_{13}$NO$_5$)$_{0.02}$(C$_6$H$_{11}$NO$_4$)$_{0.13}$(C$_{13}$H$_{17}$NO$_5$)$_{0.85}$].0.63 H$_2$O; calcd. C 54.63, H 6.66, N 5.32; found C 54.42, H 6.34, N 5.49.

EXAMPLE 11

[N-(3-carboxy-)salicylidene] chitosan

As in Ex. 9, chitosan (0.33 g, 2.0 mM) was condensed with 3-formyl-2-hydroxy-benzoic acid (0.39 g, 2.35 mM) dissolved in methanol (10 ml) to produce a bright yellow and very rigid gel within 3 min. The product was yellow and odourless and had a d.s. 1.0 (0.53 g).

Anal. for [(C$_8$H$_{13}$NO$_5$)$_{0.02}$(C$_{14}$H$_{15}$NO$_7$)$_{0.98}$].1.01 H$_2$O; calcd. C 51.24, H 5.26, N 4,31; found C 51,26, H 5.20, N 4.17.

EXAMPLE 12

Carboxymethyl derivatives of chitosan and chitin

Chitin or chitosan was suspended in DMSO (15 ml) for 1 d prior to the treatment which was used for the preparation of both derivatives. The polysaccharides (0.5 g) were suspended in an aqueous (65%) NaOH solution (50 ml) for 0.5 hr to produce the alkali derivatives which were filtered, pressed, and then added to a solution of monochloroacetic acid (2.6 g) in i-propanol (50 ml). The suspensions were stirred for 1 hr, filtered, resuspended in water (100 ml) and the solution pH was raised (from 3.5–4.0) with conc. NaOH solution to neutral. The chitosan derivative formed a gel at this stage, which was lyophilized. The solid carboxymethyl chitin was filtered, pressed and dried.

Anal. for chitosan derivative d.s. 1.2 [(C$_{12}$H$_{17}$NO$_{10}$)$_{0.1}$(C$_8$H$_{13}$NO$_6$)$_{0.9}$].1.02 H$_2$O; calcd. C 40.46, H 6.25, N 5.62; found C 40.29, H 6.67, N 5.56.

Anal. for chitin derivative d.s. 1.0 [(C$_8$H$_{13}$NO$_6$)$_{0.1}$(C$_{10}$H$_{15}$NO$_7$)$_{0.9}$]; calcd. C 45.78, H 5.81, N 5.45; found C 45.89, H 6.86, N 5.46.

EXAMPLE 13

Solubilized salicylidene chitosan (mixed substituents)

To chitosan (0.50 g, 3.0 mM), dissolved in a mixture (1:1) of methanol and 1% aqueous HOAc, was added lactose (0.30 g, 0.9 mM) in MeOH (4 ml) and subsequently, salicylaldehyde (0.35 ml, 3.5 mM) and NaCNBH$_3$ (0.3 g, 4.8 mM) dissolved in water (4 ml). The vigorously stirred mixture lost its yellow colour after a short time and produced a soft, faintly yellow gel. The product had an overall d.s. 1.0 with 25% sugar substitution.

Anal. for [(C$_8$H$_{13}$NO$_5$)$_{0.05}$(C$_{13}$H$_{17}$NO$_5$)$_{0.71}$(C$_{18}$H$_{33}$NO$_{14}$)$_{0.24}$]; calcd. C 52.85, H 6.57, N 4.42; found C 52.51, H 5.95, N 4.20.

EXAMPLE 14

N-Ferrocenyl chitosan

To chitosan (0.20 g, 1.2 mM), dissolved in a mixture of methanol and 1% aqueous acetic acid (1:1, 50 ml) was carefully added, with stirring, a solution of ferrocenealdehyde (0.30 g, 1.4 mM) and NaCNBH$_3$ (0.9 g, 14.4 mM) in methanol (10 ml). The initially red reaction mixture was left stirring overnight yielding a fine brown precipitate which was filtered, washed (methanol), and dried. 0.38 g of the brown product (d.s. 0.445) was isolated.

Anal. for [(C$_8$H$_{13}$NO$_5$)$_{0.02}$(C$_6$H$_{11}$NO$_4$)$_{0.54}$(C$_{17}$H$_{21}$FeNO$_4$)$_{0.44}$]; calcd. C 48.83, H 5.83, N 5.26, Fe 9.37; found C 48.60, H 5.90, N 5.32, Fe 10.06.

EXAMPLE 15

Enhancement of Chelating Performance

Chitosan was condensed with salicylaldehyde as described above to afford the Schiff's base derivative salicylidene-chitosan (1).

Reduction of the acid-labile, base-stable azomethine function of salicyclidene-chitosan (1), with sodium cyanoborohydride simultaneous with its formation produced a very soft, ivory coloured gel, which after dialysis and lyophilization, gave the amine (2) (d.s. 0.6) as a fluffy, off-white material. (Attempts to carry out the reduction consecutive to the formation of (1) were only partially successful as indicated by the retention of most of the yellow colour and rigidity of the gel initially produced.) The analogous Schiff's base derivative (3) (d.s. 1.0) was produced in similar fashion from 3-formyl-2-hydroxy benzoic acid.

The salicylidene chitosans (1), (2) and (3), like chitin (4) and chitosan (5), readily reacted with copper(II) acetate in either aqueous or methanolic (no substantial differences in Cu-chelation capacity between these media were observed) solution to produce coloured complexes (see Table 3), which could be characterized by esr spectroscopy.

Atomic absorption spectroscopy was used to quantitatively determine the amounts of Cu(II) incorporated into the derivatives. Table 3 shows that the copper chelation capacity of the amine (2), sampled after 12 hr reaction time, was enhanced by a factor of four over that of (1), and a 50 factor over that of (3) or chitosan (5).

This increased chelating capacity of (2) over (1) is in line with the observed stability constants of the copper-(II) complexes of related ligand systems. Furthermore, the greater porosity of (2), a fluffy, water-insoluble material which in contrast to its solid analogue (1) and other derivatives, swelled considerably in aqueous or alcoholic solution, is presumably also partly responsible for this observation. More information was gained from experiments in which attempts were made to elute the copper ions from the complexes (1) and (2), using 0.1 M EDTA solution at pH 8. This proceeded successfully for the former case, whereas ~30–40% of the copper was retained by the latter complex, which was, however, completely "demetallated" by treatment with aqueous acid (pH 2). These findings testify again to the greater chelating ability of (2).

TABLE 3

Copper Chelation Performance of some Chitin and Chitosan Derivatives[a]

| Cmpd | Time[b] (hr) | Copper Content mmol/g[c] | % of theory | Colour parent polymer | Cu(II) complex |
|---|---|---|---|---|---|
| (1) | 1 | 0.54 | 23 | deep yellow | light green |
|  | 12 | 0.62 | 26 |  | dark green |
| (2) | 1 | 2.19 | 72 | white | green |
|  | 12 | 3.03 | 100 |  | dark green |
| (3) | 1 | 0.02 | 1 | deep yellow | deep yellow |
|  | 12 | 0.06 | 2 |  | deep yellow |
|  | 20 | — | — |  | green yellow |
| (6) | 1 | 0.42 | 13 | white | light blue |
|  | 12 | 2.64 | 80 |  | turquoise |
| (7) | 1 | 0.26 | 7 | light yellow | light green |
|  | 12 | 0.40 | 11 |  | turquoise |
| (5) | 12 | 0.06 | 1 | white | blue |
| (4) | 12 | 0.18 | 4 | yellow | light blue |
| (8) | 12 | 0.01 | 0.3 | light yellow | light yellow |

[a] in methanol at 25° C.
[b] contact time
[c] millimole per gram polymer

It is interesting to note (see Table 3) that the amine (2), its analogue (1), and chitosan (5) chelated a relatively large proportion (72%, 87%, and 86%, respectively) of their total uptake within a short period (1 hr), whereas (3) complexed a relatively smaller amount (30%) of copper. The high chelating rate of (2) was also reflected in the almost instantaneous colouration (green) when this material was added to a solution of cupric or nickelous ions.

The carboxymethyl derivatives of chitin (6) (d.s. 1.0) and chitosan (7) (d.s. 1.2) formed turquoise copper(II) complexes. Both of these derivatives had a greater chelation ability than their non-derivatized precursors (5) and (4)—20 times and 11 greater, respectively,—see Table 3. The carboxymethyl derivatives are good candidates for commercial-scale metal complexation. The N-galactosyl chitosan (8) on exposure to Cu(II) ions did not alter its colour nor produce a detectable esr signal (see Table 3). This chelation inhibition is presumably due to the non-porous nature of the material which appears (SEM) relatively impervious to metal ions.

Recently, we have also found that galactose-containing polymers particularly galactomannans such as guar gum and locust bean gum, can be derivatized by first introducing a primary amine group and then further reacting as for chitosan. The operative polymers should have pendant galactose residues.

Galactomannans are assuming an ever increasing role in various branches of industry, notably in foods, pharmaceuticals, paper products, cosmetics, paints, drilling, and explosives. Guar gum and locust bean gum are two of the more important galactomannan polysaccharides which are mainly derived from the seeds of leguminous plants or from microbial sources. Their primary physiological function appears to be the retention of water (by solvation), preventing the drying out of the seeds, and also their capacity as food reserves. In addition, galactomannans assume important roles in the inhibition of viruses and in interferon induction.

Both guar gum (MW 220,000) and locust bean gum (MW 310,000) contain a β-D (1-4) linked mannan backbone which carries α-D-galactosyl residues at the C-6 positions and assumes a ribbon-like structure. The mannose (M) to galactose (G) ratio varies from 1.8:1 for guaran to 4:1 for locust bean gum.

The rheological properties of aqueous solutions of both gums are of particular interest for many reasons: they behave as non-Newtonian solutions which, by themselves, form no gels unless borate or transition metal ions are added. The gums are stable over a wide pH range and are compatible with many salts. The viscosity and shear stability of guar and its derivatives have made these preferred gelling agents for fracturing fluids in the oil industry.

To form the derivatives, the galactose moieties are first oxidized to introduce aldehyde groups. Galactose oxidase was used to introduce an aldehyde group at C-6 of the pendant galactose units of guar gum or locust bean gum. For example, pure guar gum (60 mg, 0.12 mM, equivalents galactose) in phosphate buffer (pH 7, 25 mM, 15 ml) reacted with galactose oxidase (90 units) in the presence of catalase (E.C. 1.11.1.6, 10500 units) for 24 hr, afforded a very viscous ropy material. Omission of catalase led to an approximate four-fold reduction in yields. With locust bean gum the enzyme oxidation proceeded with a greater efficiency.

The galactomannan oxidation procedures using galactose oxidase were shown to be high-yielding and specific, but may, nevertheless be not directly compatible with industrial applications in view of the costs involved. Enzyme immobilization and controlled periodate oxidation can be used as two alternative, less expensive routes.

The following examples are illustrative of these oxidation procedures.

Oxidation Procedures on Galactomannans (a) Galactose oxidase. The galactomannan (70–200 mg) was dissolved in phosphate buffer (25 mM, pH 7, 20 ml) by shaking for several hours. The resulting solution was purged with oxygen for several minutes before adding catalase (90000 units/0.1 mM galactose equivalents), and galactose oxidase (100 units/0.1 mM galactose equivalents). The samples were kept at 24° C. on a constant temperature shaker for 24–36 hr. The viscosity of the reaction mixture increased sharply during the course of the oxidation affording a ropy gel for both guar and locust bean gum polysaccharides after a few hours. The gel formation could be avoided by performing the reaction at greater dilutions (~50 ml solution volume). The aldehyde products were isolated by (i) diluting the sample with an equal volume of phosphate buffer prior to ethanol precipitation (250 ml). The precipitate was then collected by centrifugation (7000 rpm, 40 min); or (ii) extensive dialysis and lyophilization.

(b) Periodate oxidations. The polysaccharide (0.3 mM galactose equivalents) was dissolved in phosphate buffer (20 ml) as before and 1-propanol (1 ml) was added followed by aqueous solutions (2 ml) of sodium metaperiodate (0.23 mM/mol hexose unit for guaran and 0.17 mM/mol hexose unit for locust bean gum). The oxidation was conducted at 5° C. in the dark for 15 hr after which it was stopped by addition of ethylene glycol (1 ml). When the oxidation was carried out in smaller solution volumes (~8 ml) the same ropy gels were obtained as in the case of galactose oxidase treatments. The dialdehyde products were isolated after dialysis (3 d).

The resulting aldehyde groups are reductively aminated to introduce a primary amine function and provide a key cationic intermediate. This amination is carried out with an ammonium salt, preferably ammonium acetate.

The reductive aminations of the C-6 aldehyde derivatives were carried out in situ after oxidation or by dissolving the isolated aldehyde products in aqueous solution followed by treatment with the amine (4–8 mol/galactose equivalent) and sodium cyanoborohydride (20–40 mol/galactose equivalent) at ambient temperature for 24–36 hr. The products were isolated by dialysis (4–6 d) and lyophilization.

The following examples are illustrative of reductive amination with ammonium carboxylate and of further reductive alkylation (as for chitosan) of the inserted amino groups. 6-[N-amino] guaran derivative Reductive amination of aldehyde-guar with ammonium acetate (6 mol/aldohexose unit) for 3 d yielded the title product having d.s. 0.55.

Anal. for $[(C_6H_{10}O_5)_{0.64}(C_6H_{10}O_5)_{0.16}(C_6H_{12}NO_5)_{0.20}].0.56\ H_2O$; calcd. C 40.48, H 6.52, N 1.56; found C 40.27, H 6.46, N 1.54. 6-[N-1-deoxy-1-lactit-1-yl amine] guaran derivative C6-N-amino guaran (55 mg, 0.33 mM) was reductively alkylated with lactose (400 mg, 1.17 mM) to afford, after 2 d, the title derivative of d.s. 0.4, (based on amino-guaran). Anal. for $[(C_6H_{10}O_5)_{0.64}(C_6H_{10}O_6)_{0.16}(C_6H_{12}NO_5)_{0.12}(C_{18}H_{34}NO_{15})_{0.08}].1.82\ H_2O$; Calcd. C 38.94, H 6.74, N 1.41; found C 38.65, H 6.49, N 1.29.

All of the reactants operative with chitin or chitosan to introduce substituents of the type (a), (b), (c) and (d) can be used to derivatize the primary amine functions in the oxidized aminated galactose-containing polymers.

The metal complexes involving Cu, Co, Fe, Cr, Rh, Ru, can be used for both homogeneous and heterogeneous catalysis, polymerization, hydrogenation, decarbonylation, e.g. Cu(II) Schiff's base complexes are homogeneous catalysts for the oxidative coupling of phenols. The corresponding Co(II) complexes are homogeneous catalysts for the oxygenation for alkyl phenols, Co(II) Schiff's base complexes are homogeneous catalysts for vinyl polymerizations.

Other applications include use in chromatography, treatment of environmental pollutants, waste water treatment, recovery of trace metals (such as U) from sea water, blood decontamination from radionuclides (such as plutonium), and as supports or carriers for new metal-containing drugs.

It is particularly important to note that chitosan can be converted into watersoluble derivatives wherein the substituents are of formula (b), or a combination of (b) and either (a), or (d). Water solubility can be accomplished at relatively low degrees of substitution (d.s.) ie, d.s. 0.14 for derivatives of formula (b) and d.s. 0.25 for a mixture of (b) and substituents (a), (c), or (d).

The chitosan derivatives offer a wide range of solubility, gelling and compatibility properties. Thus, derivatives of examples (2), (5), (6) form rigid gels at concentrations above 3–5% in aqueous solution; derivatives of examples (1) and (3) gelled in acidic solutions; the derivative of example (7) gelled in basic solutions. The derivatives of examples (4) and (5) exhibit stability to alkaline media, while examples (4) and (7) were also compatible with 50% aqueous alcohol solutions. Aqueous solutions of example (5) did not gel or precipitate when mixed with calcium chloride, chromium chloride, tin chloride, potassium chromate, boric acid, or combinations thereof. The derivative of example (4), which by itself did not gel, formed rigid gels when mixed with alginate, and very viscous solutions, when mixed with guaran or locust bean gum.

Recent work has shown that metal chelating derivatives of chitosan can be obtained with substituents other than of the type (a), where R is a macrocyclic ligand with an aldehyde or keto carbon atom. Suitable macrocyclic ligands include oxidized cyclodextrins, crown ethers, cryptands, and porphyrins.

The derivatives with macrocyclic substituents greatly extend the range of types of metals and elements which can be chelated or complexed. Thus, alkali, alkali earth, lanthanide, actinide, halogen or noble gas elements can be incorporated into the chitosan derivatives, whereas chitosan derivatives with substituents of the type (a) exhibit affinity towards transition metals only.

Derivatives of chitosan with macrocyclic substituents can be used for phase transfer catalysis and chromatography.

We claim:

1. Derivatives of chitin or chitosan wherein at least a part of the amine groups are covalently linked, through a $=C-$ or $-CH_2-$ linkage, and the substituents, including the amine N, have the structure:
   (a) $-N=CHR$ or $-NHCH_2R$
   (b) $-NHR'$
   (c) $-NHR''$ and
   (d) $-NH-CH_2CO_2H$ or $-NH$-glyceryl; respectively; where
   R is an aromatic ring having at least one hydroxyl or carboxyl group, or a pyridine moiety,
   R' is an aldose or ketose residue attached via the aldehyde or keto carbon atoms, and
   R'' is an organometallic aldehyde residue attached via the aldehyde carbon atom.

2. The chitin or chitosan derivatives of claim 1 wherein the substituents have one of the formulae in (a) and the aromatic moiety is derived from at least one of salicylaldehyde, 3-formyl-2-hydroxylbenzoic acid, pyridine aldehydes, and formylcinnamic acid.

3. The chitin or chitosan derivatives of claim 1 wherein the substituents are of formula (a) or (d), and are in the form of metal chelates.

4. The derivatives of claim 3 wherein the chelated metals are selected from silver, mercury, copper, lead, zinc, nickel, iron, palladium, uranium, and platinum.

5. The chitin and chitosan derivatives of claim 1 wherein the substituents have the formula (b) and R' is derived from aldoses, ketoses, and sugars oxidizable or hydrolyzable to aldoses or ketoses, selected from glucose, galactose, arabinose, xylose, N-acetylglucosamine, lactose, cellobiose, maltose, and melibiose.

6. The chitin and chitosan derivatives of claim 1 wherein the substituents are of formula (c) and the organometallic residues are selected from ferrocenes, haemin, and m-toluidine chromium tricarbonyl.

7. The chitin and chitosan derivatives of claim 1 having a mixture of substituents selected from (a), (b), (c) and (d) to give a desired balance of properties.

8. The chitin and chitosan derivatives of claim 5 wherein the substituents are derived from galactose and the galactosyl substituent is oxidized to form an aldehyde group and reductively aminated in situ to introduce an amine moiety and provide further branching.

9. The chitin and chitosan derivatives of claim 5 wherein the substituents are derived from N-acetylglucosamine, and the glucosamine substituent deacetylated and amine group reductively alkylated in situ to provide further branching.

10. The chitin and chitosan derivatives of claim 7 having a mixture of both aromatic and sugar type substituents.

* * * * *